US010226750B2

(12) United States Patent
Wang

(10) Patent No.: US 10,226,750 B2
(45) Date of Patent: Mar. 12, 2019

(54) CO-AGGLOMERATED COMPOSITE MATERIALS, METHODS FOR MAKING CO-AGGLOMERATED COMPOSITE MATERIALS, AND METHODS FOR USING CO-AGGLOMERATED COMPOSITE MATERIALS

(71) Applicant: Imerys Filtration Minerals, Inc., San Jose, CA (US)

(72) Inventor: Bo Wang, Union City, CA (US)

(73) Assignee: Imerys Filtration Minerals, Inc., San Jose, CA (US)

( * ) Notice: Subject to any disclaimer, the term of this patent is extended or adjusted under 35 U.S.C. 154(b) by 112 days.

(21) Appl. No.: 15/108,084

(22) PCT Filed: Dec. 15, 2014

(86) PCT No.: PCT/US2014/070395
§ 371 (c)(1),
(2) Date: Jun. 24, 2016

(87) PCT Pub. No.: WO2015/100050
PCT Pub. Date: Jul. 2, 2015

(65) Prior Publication Data
US 2016/0317999 A1 Nov. 3, 2016

Related U.S. Application Data

(60) Provisional application No. 61/920,829, filed on Dec. 26, 2013.

(51) Int. Cl.
*B01J 20/04* (2006.01)
*B01J 20/12* (2006.01)
(Continued)

(52) U.S. Cl.
CPC ............ *B01J 20/14* (2013.01); *B01J 20/041* (2013.01); *B01J 20/10* (2013.01); *B01J 20/103* (2013.01);
(Continued)

(58) Field of Classification Search
CPC . B01J 20/14; B01J 20/12; B01J 20/106; B01J 20/041; B01J 20/28011;
(Continued)

(56) References Cited

U.S. PATENT DOCUMENTS 3,764,456 A * 10/1973 Harris et al. ............. C08K 7/10
106/DIG. 3
4,225,443 A * 9/1980 Harris .................... B01D 39/06
210/263

(Continued)

FOREIGN PATENT DOCUMENTS

EP       0 790 070 A1      8/1997
EP       2444460 A1 *      1/2010

(Continued)

OTHER PUBLICATIONS

Supplementary European Search Report dated Jul. 21, 2017, in EP Application No. 14875728.9 which corresponds to PCT/US2014/070395 (10 pgs.).

(Continued)

*Primary Examiner* — Ana M Fortuna
(74) *Attorney, Agent, or Firm* — Finnegan, Henderson, Farabow, Garrett & Dunner LLP

(57) ABSTRACT

A composite filter aid may include a first mineral selected from diatomaceous earth and natural glass. The filter aid may also include a second mineral having and aspect ratio greater than about 2:1, and a binder. The filter aid may have a permeability ranging from 0.2 to 20 darcys. A method for making a composite filter aid may include blending a first (Continued)

mineral, a second mineral, and a binder, wherein the first mineral comprises at least one of diatomaceous earth and natural glass, and the second mineral has an aspect ratio greater than about 2:1. The method may further include agglomerating the first mineral and second mineral in the presence of the binder to form the composite filter aid. A method for filtering a beverage may include using the composite filter aid.

18 Claims, 4 Drawing Sheets

(51) Int. Cl.
| | |
|---|---|
| *B01J 20/14* | (2006.01) |
| *B01J 20/22* | (2006.01) |
| *B01J 20/24* | (2006.01) |
| *B01J 20/28* | (2006.01) |
| *B01J 20/10* | (2006.01) |
| *B01J 20/26* | (2006.01) |
| *B01J 20/30* | (2006.01) |
| *C12H 1/044* | (2006.01) |

(52) U.S. Cl.
CPC ............ *B01J 20/106* (2013.01); *B01J 20/12* (2013.01); *B01J 20/22* (2013.01); *B01J 20/24* (2013.01); *B01J 20/261* (2013.01); *B01J 20/2803* (2013.01); *B01J 20/28004* (2013.01); *B01J 20/28011* (2013.01); *B01J 20/28057* (2013.01); *B01J 20/28059* (2013.01); *B01J 20/28076* (2013.01); *B01J 20/28085* (2013.01); *B01J 20/28088* (2013.01); *B01J 20/3028* (2013.01); *B01J 20/3078* (2013.01); *C12H 1/0408* (2013.01)

(58) Field of Classification Search
CPC ............ B01J 20/28076; B01J 20/28004; B01J 20/28085; B01J 2820/28059; B01D 39/06; B01D 2239/0407; B01D 2239/086; B01G 20/14; B01G 20/106; C04B 35/62645; C04B 35/62695; C04B 35/632; Y02A 40/164; C07D 213/74
See application file for complete search history.

(56) References Cited

U.S. PATENT DOCUMENTS

| | | | |
|---|---|---|---|
| 4,488,972 A | 12/1984 | Weinstein | |
| 4,766,000 A * | 8/1988 | Sobus | ................. C12H 1/0408 210/502.1 |
| 5,141,526 A | 8/1992 | Chu | |
| 6,712,974 B1 | 3/2004 | Palm et al. | |
| 2005/0145579 A1 | 7/2005 | Drohmann et al. | |
| 2009/0181848 A1 | 7/2009 | Lenz et al. | |
| 2009/0261041 A1 | 10/2009 | Hu et al. | |
| 2010/0016459 A1* | 1/2010 | Cernohous | ............. C08J 9/0066 521/146 |
| 2010/0104873 A1* | 4/2010 | Wang | ....................... B01J 21/08 428/406 |
| 2010/0107929 A1* | 5/2010 | Gay | ........................ C04B 33/04 106/286.5 |
| 2010/0285189 A1 | 11/2010 | Schoelkopf et al. | |
| 2011/0195168 A1* | 8/2011 | Wang | ................... B01J 20/3028 426/490 |
| 2012/0046165 A1* | 2/2012 | Lu | ............................ B01J 20/10 502/406 |
| 2012/0175805 A1 | 7/2012 | Yavorsky | |
| 2014/0171305 A1* | 6/2014 | Nannini | ............... B01J 20/3078 502/411 |
| 2014/0346112 A1* | 11/2014 | Wang | .................. B01D 37/025 210/650 |
| 2016/0317999 A1* | 11/2016 | Wang | ....................... B01J 20/14 |
| 2016/0361675 A1* | 12/2016 | Johnston | .................. C02F 1/50 |
| 2017/0233301 A1* | 8/2017 | Sharma | .................... C02F 1/42 71/32 |
| 2018/0016190 A1* | 1/2018 | Wang | ....................... A23L 2/80 |

FOREIGN PATENT DOCUMENTS

| | | |
|---|---|---|
| WO | WO 2013/014450 A1 | 1/2013 |
| WO | WO 2013/096578 A1 | 6/2013 |
| WO | WO 2014/004349 A1 | 1/2014 |

OTHER PUBLICATIONS

International Search Report and Written Opinion dated Apr. 10, 2015, in International Application No. PCT/US2014/070395 (13 pgs.).

* cited by examiner

CO-AGGLOMERATED COMPOSITE MATERIALS, METHODS FOR MAKING CO-AGGLOMERATED COMPOSITE MATERIALS, AND METHODS FOR USING CO-AGGLOMERATED COMPOSITE MATERIALS

CLAIM FOR PRIORITY

This application is a U.S. national phase entry under 35 U.S.C. § 371 from PCT International Application No. PCT/US2014/070395, filed Dec. 15, 2014, which claims the benefit of priority of U.S. Provisional Patent Application No. 61/920,829, filed Dec. 26, 2013, to both of which this application claims the benefit of priority, and the entirety of the subject matter of both of which is incorporated herein by reference.

DESCRIPTION

Field

This disclosure is related to co-agglomerated composite materials, methods for making co-agglomerated composite materials, and methods for using co-agglomerated composite materials. More particularly, this disclosure is related to co-agglomerated composite materials that may be used in filtration applications, and methods for making and using such co-agglomerated composite materials.

Background

In many filtration applications, a filtration device may include a filter element, such as a septum, and a filter-aid material. The filter element may be of any form such that it may support a filter-aid material. For example, the filter element may include a cylindrical tube or wafer-like structure covered with a plastic or metal fabric of sufficiently fine weave. The filter element may be a porous structure with a filter element void to allow material of a certain size to pass through the filtration device. The filter-aid material may include one or more filtration components, which, for example, may be inorganic powders or organic fibrous materials. Such a filter-aid material may be used in combination with a filter element to enhance filtration performance of a filtration device.

For example, the filter-aid material may initially be applied to a septum of a filter element in a process known as "pre-coating." Pre-coating may generally involve mixing a slurry of water and filter-aid material, and introducing the slurry into a stream flowing through the septum. During this process, a thin layer, such as, for example, about 1.5 mm to about 3.0 mm, of filter-aid material may eventually be deposited on the septum, thus pre-coating the septum.

During filtration of a fluid, various insoluble particles in the fluid may become trapped by the filter-aid material. The combined layers of filter-aid material and particles and/or constituents to be removed accumulate on the surface of the septum. Those combined layers are known as "filter cake." As more and more particles and/or constituents are deposited on the filter cake, the filter cake may become saturated with debris to the point where fluid is no longer able to pass through the septum.

To combat this situation, a process known as "body feeding" may be used. Body feeding is the process of introducing additional filter-aid material into the fluid to be filtered before the fluid reaches the filter cake. The filter-aid material will follow the path of the unfiltered fluid and will eventually reach the filter cake. Upon reaching the filter cake, the added filter-aid material will bind to the cake in a similar manner to how the filter-aid material is bound to the septum during the pre-coating process. The additional layer of filter-aid material may cause the filter cake to swell and thicken, and may increase the capacity of the filter cake to entrap additional debris. The filter aid typically has an open porous structure, which maintains an open structure in the filter cake, thus ensuring continued permeability of the filter cake.

In the field of fluid filtration, diatomaceous earth and natural glasses are commonly employed as filter aids. Diatomaceous earth products may be obtained from diatomaceous earth (also called "DE" or "diatomite"), which is generally known as a sediment-enriched in biogenic silica (i.e., silica produced or brought about by living organisms) in the form of siliceous skeletons (frustules) of diatoms. Diatoms are a diverse array of microscopic, single-celled, golden-brown algae generally of the class Bacillariophyceae that possess an ornate siliceous skeleton of varied and intricate structures including two valves that, in the living diatom, fit together much like a pill box.

Diatomaceous earth may form from the remains of water-borne diatoms and, therefore, diatomaceous earth deposits may be found close to either current or former bodies of water. Those deposits are generally divided into two categories based on source: freshwater and saltwater. Freshwater diatomaceous earth is generally mined from dry lakebeds and may be characterized as having a low crystalline silica content and a high iron content. In contrast, saltwater diatomaceous earth is generally extracted from oceanic areas and may be characterized as having a high crystalline silica content and a low iron content.

Natural glasses, commonly referred to as "volcanic glasses," are generally formed by the rapid cooling of siliceous magma or lava. Several types of natural glasses are known, including, for example, perlite, pumice, pumicite, obsidian, pitchstone, and volcanic ash. Prior to processing, perlite may be gray to green in color with abundant spherical cracks that cause it to break into small pearl-like masses. Perlite may thermally expand upon processing. Pumice is a lightweight glassy vesicular rock. Obsidian may be dark in color with a vitreous luster and a characteristic conchoidal fracture. Pitchstone has a waxy resinous luster and may be brown, green, or gray. Volcanic glasses such as perlite and pumice occur in massive deposits and find wide commercial use. Volcanic ash, often referred to as "tuff" when in consolidated form, may include small particles or fragments that may be in glassy form.

Other minerals include mica, talc, clay, kaolin, smectite, wollastonite, and calcium carbonate. For example, mica is a mineral having a layered or platy texture. Mica may occur in igneous, metamorphic, and sedimentary regimes. Large crystals of mica may be typically mined from granitic pegmatites. Mica may have a median particle size ranging from, for example, about 20 microns to about 60 microns, and/or may have an aspect ratio ranging from, for example, about 20 to about 60.

In the field of filtration, methods of particle separation from fluids may employ diatomaceous earth products or natural glass products as filter aids. The intricate and porous structure unique to diatomaceous earth may, in some instances, be effective for the physical entrapment of particles in filtration processes. It is known to employ diatomaceous earth products to improve the clarity of fluids that exhibit "turbidity" or contain suspended particles or particulate matter. Turbidity is the cloudiness or haziness of a fluid, where the haze may be caused by individual particles that are suspended in the fluid. Materials that may cause a fluid to be turbid include, for example, clay, silt, organic matter, inorganic matter, and microscopic organisms.

Diatomaceous earth and natural glass may be used in various aspects of filtration. For example, as a part of pre-coating, diatomaceous earth or natural glass products may be applied to a filter septum to assist in achieving, for example, any one or more of: protection of the septum, improvement in clarity, and expediting of filter cake removal. As a part of body feeding, diatomaceous earth or natural glass may be added directly to a fluid being filtered to assist in achieving, for example, either or both of: increasing flow rate and extending of the filtration cycle. Depending on the requirements of the specific separation process, diatomaceous earth or natural glass may be used in multiple stages including, but not limited to, in a pre-coating stage and in a body feeding stage.

Known diatomaceous earth or natural glass products may suffer from any number of attributes that make them inappropriate for filtration use, cause them to be less desirable, or cause them to have poor or improvable performance in a particular application, for instance in filtering applications. For example, known diatomaceous earth or natural glass products may have at least one of a high crystalline silica content, a high impurity content, and low permeability. Thus, it may be desirable to improve diatomaceous earth or natural glass products such that they exhibit improved performance in a given application, such as lower impurity content and/or higher permeability in filtration applications.

SUMMARY

In accordance with a first aspect, a composite filter aid may include a first mineral selected from a diatomaceous earth and natural glass. The filter aid may also include a second mineral having an aspect ratio of greater than about 2:1, and a binder. The filter aid may have a permeability ranging from 0.2 to 20 darcys. According to another aspect, the filter aid may have a permeability ranging from 0.3 to 3 darcys.

As used in herein, the expression "aspect ratio" means "the diameter of the circle of area equivalent to that of a face of the particle divided by the mean thickness of that particle." Aspect ratio may be determined using electron microscopy methods. For example, for a given particle, for a superimposed circle having an area equivalent to that of the face of the particle, where the diameter of that circle is d, the thickness of the particle is t, the aspect ratio of the particle is d divided by t.

According to yet another aspect, a ratio of the first mineral to the second mineral may range from 1:99 to 99:1 by weight. According to a further aspect, the ratio of the first mineral to the second mineral may range from 1:3 to 3:1 by weight.

According to a further aspect, the filter aid may have a bulk density ranging from about 7 lbs/ft$^3$ to about 14 lbs/ft$^3$. According to yet another aspect, the filter aid may have a wet density ranging from about 12 lbs/ft$^3$ to about 19 lbs/ft$^3$. According to still another aspect, the filter aid may have a pore volume ranging from about 2 ml/g to about 4 ml/g. According to yet another aspect, the filter aid may have a median pore diameter ranging from 2 microns to about 6 microns. According to a further aspect, the composite filter aid may have a BET surface area ranging from 5 m$^2$/g to 50 m$^2$/g. According to another aspect, the composite filter aid may have a porosity ranging from 3 to 7 liters per milligram (l/mg).

According to a further aspect, the composite filter aid may have a $d_{10}$ ranging from 10 to 30 microns. According to another aspect, the composite filter aid may have a $d_{50}$ ranging from 30 to 70 microns. According to a further aspect, the composite filter aid may have a $d_{90}$ ranging from 80 to 120 microns.

The distribution of particle size of the particles identified herein may be referred to as "particle size distribution" or "psd." The particle size distribution (psd) is measured in terms of equivalent spherical diameter (esd). As used herein, the "$d_{10}$" characteristic of particle size distribution of a sample of particles is the value at which there are 10% by weight of the particles of the sample that have an esd less than the indicated $d_{10}$ particle size (the $d_{10}$ value). As used herein, the "$d_{50}$" characteristic of particle size distribution, sometimes referred to as the "median particle size," is the value at which there are 50% by weight of the particles of the sample that have an esd less than the indicated $d_{50}$ particle size (the $d_{50}$ value). As used herein, the "$d_{90}$" characteristic of particle size distribution, sometimes referred to as the "top particle size," is the value at which there are 90% by weight of the particles of the sample that have an esd less than the indicated $d_{90}$ particle size (the $d_{90}$ value). The particle size properties referred to herein may be measured in a well-known manner, such as, for example, using a Leeds and Northrup Microtrac X100 laser particle size analyzer (Leeds and Northrup, North Wales, Pa., USA), which can determine particle size distribution over a particle size range from 0.12 μm to 704 μm. Such a machine may provide measurements and a plot of the cumulative percentage by weight of particles having a size, referred to in the art as "equivalent spherical diameter" (esd), less than the given esd values.

According to still another aspect, the composite filter aid may have a beer soluble iron (BSI) content of less than 5 ppm, as measured by the American Society of Brewing Chemists (ASBC). For example, the filter aid may have a BSI content of less than 1 ppm, as measured by ASBC. In the United States, ASBC has set forth a method to measure the BSI content in parts per million, wherein a sample of BUDWEISER® beer is contacted with the filter aid and the resulting iron content in the beer is measured.

In the ASBC method, for example, BSI content may be measured by placing a 5 g sample of diatomite in 200 mL of decarbonated beer (for example, BUDWEISER®) at room temperature, and the mixture is swirled intermittently for an elapsed time of 5 minutes and 50 seconds. The mixture is then immediately transferred to a funnel containing 25 cm diameter filter paper, from which the filtrate collected during the first 30 seconds is discarded. Filtrate is collected for the next 150 seconds, and a 25 mL portion is treated with approximately 25 mg of ascorbic acid (i.e., $C_6H_8O_6$) to reduce dissolved iron ions to the ferrous (i.e., $Fe^{2+}$) state (thus yielding a "sample extract"). The color is developed by addition of 1 mL of 0.3% (w/v) 1,10-phenanthroline, and after 30 minutes, the absorbance of the resulting sample solution is compared to a standard calibration curve. The calibration curve is prepared from standard iron solutions of known concentration in beer. Untreated filtrate is used as a method blank to correct for turbidity and color. Absorbance is measured at 505 nm using a spectrophotometer.

According to still a further aspect, the composite filter aid may have a beer soluble iron (BSI) content of less than 100 ppm, as measured by the European Beverage Convention (EBC) method. For example, the filter aid may have a BSI content of less than 80 ppm, less than 50 ppm, or less than 30 ppm as measured by EBC.

The European Beverage Convention (EBC) method contacts a potassium hydrogen phthalate solution with the filter aid and then analyzes the filtered liquid for iron content. The American Society of Brewing Chemists (ASBC) method contacts a sample of beer with the filter aid and then measures the resulting iron content in the liquid. Other protocols may also be known and used.

The EBC method uses an international method for determining the beer soluble iron content of a filter aid. More specifically, the EBC method uses, for example, about 10 g/L solution of potassium hydrogen phthalate (KHP, $KHC_8H_4O_4$) in distilled water as the extractant. In the EBC method, about 5 g of a filter aid sample is mixed with about 200 mL of the KHP solution for about 2 hours using a magnetic stirrer so that the filter aid remains in suspension during extraction. The resulting solution is then filtered immediately through a filter paper, about the first 50 mL is discarded, and about the next 100 mL is collected for analysis. Extracts are then analyzed for iron concentration by the FERROZINE method, in which a FerroZine® reagent (disodium salt of 3-(2-pyridyl)-5,6-bis (4-phenylsulfonic acid)-1,2,4-triazine, $C_{20}H_{14}N_4O_6S_2$, available from Aldrich) may be used as the color development reagent. Typically, the FerroZine® reagent is prepared by dissolving about 5 g of FerroZine® reagent in about 1000 mL of an ammonium acetate/acetic acid buffer with a pH of about 4.3. The FERROZINE method uses about a 25 mL portion of the extractant, and treated with about 25 mg of ascorbic acid ($C_6H_8O_6$) to reduce dissolved iron ions to the ferrous ($Fe^{2+}$) state, thus yielding a colored iron complex with the FerroZine® when color is developed by adding about 1 mL of the FerroZine® reagent. After about 30 minutes, the absorbance of the resulting sample solution is compared to a standard calibration curve. Absorbance is measured at about 565 nm using a spectrophotometer and compared against the standard to measure BSI.

According to yet another aspect, the filter aid may have a cristobalite content of less than 20% by weight. For example, the filter aid may have a cristobalite content of less than 10% by weight, less than 6% by weight, or less than 1% by weight.

According to some aspects, the first mineral may have a surface area ranging from 5 to 40 $m^2/g$.

According to still another aspect, the first mineral may include diatomaceous earth. According to yet another aspect, the diatomaceous earth may be obtained from a freshwater source. According to another aspect, the diatomaceous earth may be obtained from a saltwater source. According to another aspect, the diatomaceous earth may include at least one of calcined diatomaceous earth and flux-calcined diatomaceous earth.

According to still a further aspect, the diatomaceous earth may have a $d_{10}$ ranging from 7 to 20 microns. According to another aspect, the diatomaceous earth may have a $d_{50}$ ranging from 20 to 50 microns. According to still a further aspect, the diatomaceous earth may have a $d_{90}$ ranging from 60 to 120 microns.

According to another aspect, the diatomaceous earth may have a pore volume ranging from about 3 ml/g to about 4 ml/g. According to a further aspect, the diatomaceous earth may have a median pore size ranging from about 1 micron to about 3 microns. According to another aspect, the diatomaceous earth may have a bulk density ranging from about 5 $lbs/ft^3$ to about 8 $lbs/ft^3$.

According to another aspect, the first mineral may include natural glass. According to a further aspect, the natural glass may include at least one of perlite, volcanic ash, pumice, shirasu, obsidian, pitchstone, and rice hull ash. According to a further aspect, the natural glass may have a $d_{10}$ ranging from 10 to 30 microns. According to a further aspect, the natural glass may have a $d_{50}$ ranging from 15 to 80 microns. According to another aspect, the natural glass may have a $d_{90}$ ranging from 50 to 150 microns.

According to a further aspect, the second mineral may include at least one of mica, talc, clay, kaolin, smectite, wollastonite, and calcium carbonate. According to a further aspect, the second mineral may have a $d_{10}$ ranging from 10 to 20 microns. According to another aspect, the second mineral may have a $d_{50}$ ranging from 10 to 70 microns. According to a further aspect, the second mineral may have a $d_{90}$ ranging from 100 to 120 microns.

According to another aspect, the binder may include at least one of an inorganic binder, an organic binder, or an organic-to-inorganic binder. According to one aspect, the binder may include an inorganic binder such as an alkali silicate, such as, for example, sodium silicate, potassium silicate, and mixtures thereof. According to another aspect, the inorganic binder may include a cement, such as a calcium aluminate cement. In another aspect, the inorganic binder may include a cement, such as a calcium phosphate cement, or a magnesium phosphate cement. In another aspect, the inorganic binder may include a magnesium aluminum silicate clay.

According to another aspect, the binder may include an organic-to-inorganic binder such as a silicone or ethyl silicate.

According to a further aspect, the binder may include one or more organic binders or biopolymers. For example, the binder may include a cellulose, polyethylene glycol (PEG), polyvinyl alcohol (PVA), polyvinylpyrrolidone (PVP), starch, Candalilla wax, a polyacrylate or related copolymer (e.g., acrylic acid-acrylamide, etc.), a polydiallyldimethylammonium chloride polymer or copolymer (pDADMAC, etc.), dextrin, lignosulfonate, sodium alginate, magnesium stearate, or mixtures thereof.

According to still another aspect, a method for making a composite filter aid may include blending a first mineral, a second mineral, and a binder. The first mineral may include at least one of diatomaceous earth and natural glass. The second mineral may have an aspect ratio of greater than about 2:1. The method may further include agglomerating the first mineral and second mineral in the presence of the binder to form the composite filter aid.

According to a further aspect, a method for making a composite material may include blending diatomaceous earth and perlite, adding alkali silicate to the blended diatomaceous earth and perlite, and precipitating the alkali silicate as a binder to make the composite material. The method may further include dispersing the alkali silicate in water. For example, the method may further include dispersing the alkali silicate in water before adding the alkali silicate to the blended diatomaceous earth and perlite. The method may further include mixing the alkali silicate and the blended diatomaceous earth and perlite or diatomaceous earth and mica or perlite and mica. The method may further include classifying the mixed alkali silicate and blended diatomaceous earth and perlite or diatomaceous earth and mica or perlite and mica. The method may further include drying the mixed alkali silicate and blended diatomaceous earth and perlite or diatomaceous earth and mica or perlite and mica. For example, the drying may include heating the mixed alkali silicate and blended diatomaceous earth and perlite or diatomaceous earth and mica or perlite and mica to a temperature ranging from 100° C. to 200° C. The method may further include, after drying the mixture, classifying the mixture. The method may further include, prior to blending the diatomaceous earth and perlite, calcining the diatomaceous earth. The method may further include calcining the mixture at a temperature ranging from, for example, about 600° C. to about 800° C.

According to yet another aspect, a method for filtering a beverage may include using a composite filter aid and/or composite material. For example, the composite filter aid and/or composite material may include at a first mineral selected from diatomaceous earth and natural glass, and a second mineral having an aspect ratio greater than about 2:1. The composite filter aid and/or composite material may further include a binder, and the composite filter aid and/or composite material may have a permeability ranging from about 0.2 to 20 darcys. The composite filter aid and/or composite material may include diatomaceous earth, perlite, and a precipitated silica binder, wherein the composite filter aid and/or composite material has a wet density less than 15 lbs/ft$^3$.

It is to be understood that both the foregoing general description and the following detailed description are exemplary and explanatory only and are not restrictive of the invention, as claimed.

DESCRIPTION OF EXEMPLARY EMBODIMENTS

Figure 1:
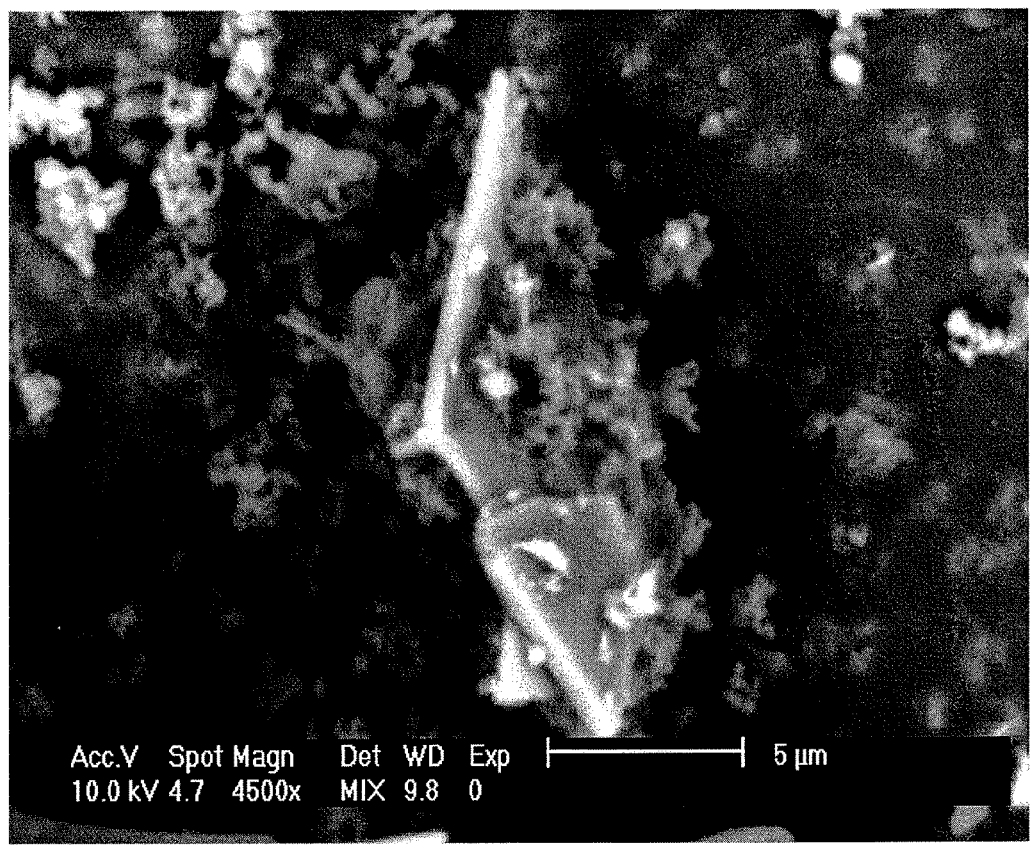
FIG. 1 is a scanning electron micrograph of a sample of an exemplary embodiment of agglomerated perlite and kaolin.
Figure 2:
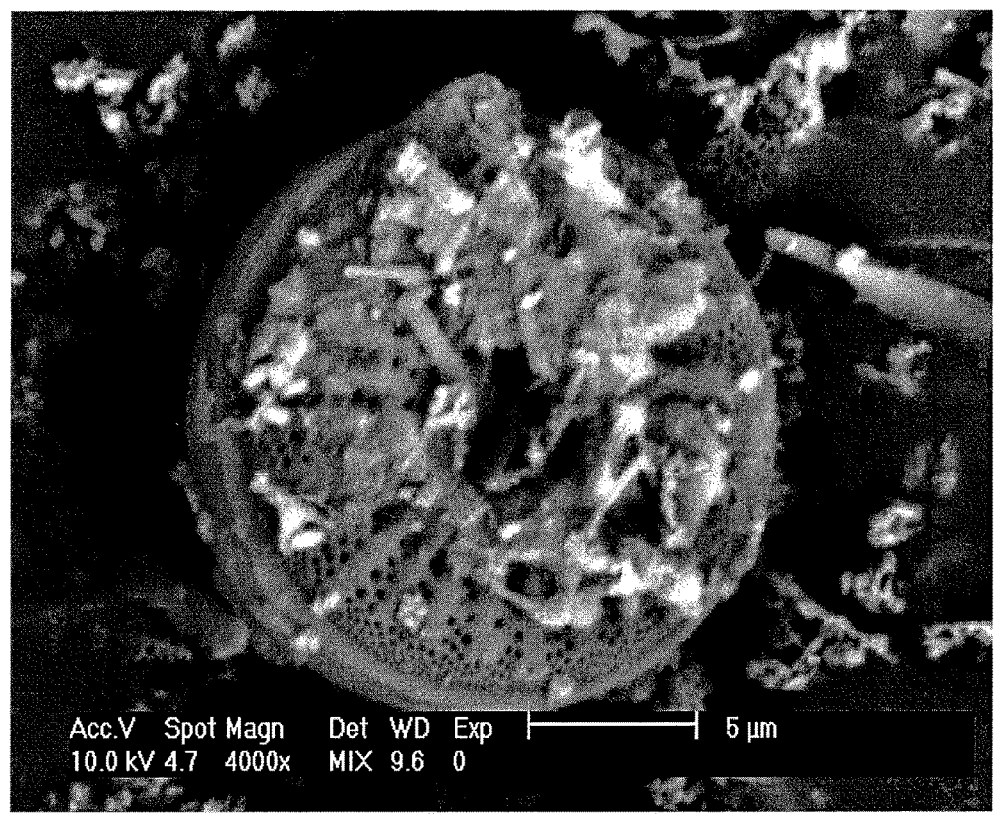
FIG. 2 is a scanning electron micrograph of a sample of an exemplary embodiment of agglomerated diatomaceous earth and kaolin.
Figure 3:
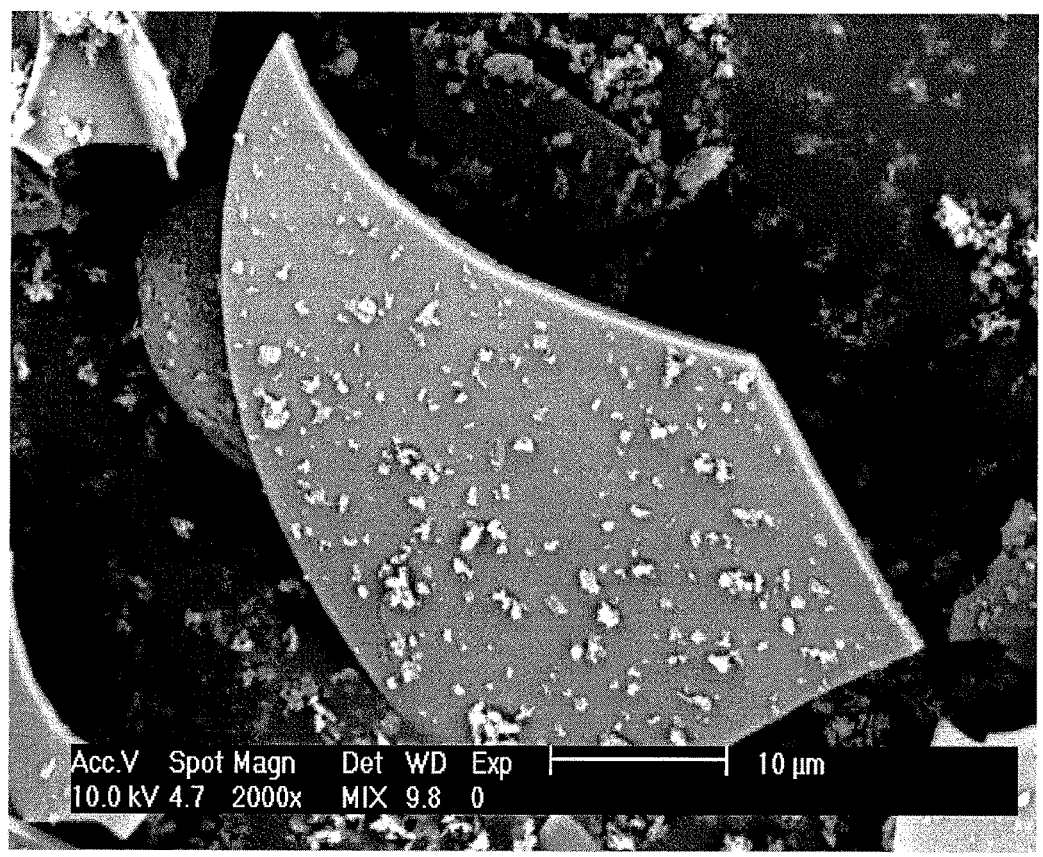
FIG. 3 is a scanning electron micrograph of a sample of an exemplary embodiment of agglomerated perlite and kaolin.

According to some embodiments, a composite material may include a co-agglomeration of a first mineral including diatomaceous earth and/or natural glass, and a second mineral having a relatively high aspect ratio, such as, for example, about 2:1. For example, the diatomaceous earth and/or natural glass may be blended with the second mineral and contacted with a solution of binder (e.g., a silica binder), so that the blended diatomaceous earth and/or natural glass co-agglomerate with the second mineral. The composite material may be used as, for example, a filter aid. The resulting filter aid may exhibit increased permeability (e.g., ranging from about 0.2 to about 20 darcys) and/or reduced turbidity. While not wishing to be bound by theory, it is believed that the co-agglomeration results in the diatomaceous earth and/or natural glass particles and second mineral attaching to one another to form larger particles relative to a blend of particles that has not been co-agglomerated.

According to some embodiments, a composite filter aid includes a first mineral including diatomaceous earth and/or natural glass, a second mineral having an aspect ratio greater than about 2:1, and a binder, and wherein the filter aid has a permeability ranging from 2 to 20 darcys. For example, the filter aid has a permeability ranging from 9 to 20 darcys or 15 to 20 darcys. The first mineral may include diatomaceous earth obtained from a freshwater source or a saltwater source. According to some embodiments, the diatomaceous earth may include at least one of calcined diatomaceous earth and flux-calcined diatomaceous earth. According to some embodiments, the first mineral may include natural glass, and the natural glass may include at least one of perlite, volcanic ash, pumice, shirasu, obsidian, pitchstone, and rice hull ash. According to some embodiments, the precipitated binder may include an inorganic binder and/or an organic binder.

According to some embodiments, the second mineral may include at least one of mica, talc, clay, kaolin, smectite, wollastonite, and calcium carbonate. According to some embodiments, the second mineral may have a $d_{10}$ ranging from 10 to 20 microns. According to some embodiments, the second mineral may have a median particle size ($d_{50}$) ranging from 10 to 70 microns. According to some embodiments, the second mineral may have a top particle size ($d_{90}$) ranging from 100 to 120 microns. According to some embodiments, the second mineral may have a median particle size ($d_{50}$) ranging from about 1 micron to about 200 microns, from about 5 microns to about 100 microns, from about 10 microns to about 75 microns, from about 20 microns to about 50 microns, or from about 50 microns to about 100 microns. According to some embodiments, the second mineral may have an aspect ratio greater than 2, greater than 2.5, greater than 3, greater than 5, greater than 10, greater than 20, or greater than 50. According to some embodiments, the second mineral may have an aspect ratio ranging from about 2 to about 50, from about 2 to about 20, from about 20 to about 100, from about 20 to about 60, or from about 60 to about 100.

According to some embodiments, the binder may include at least one of an inorganic binder, an organic binder, or an organic-to-inorganic binder.

According to some embodiments, the composite filter aid has a $d_{10}$ ranging from 10 to 30 microns, a $d_{50}$ ranging from 30 to 70 microns, and a $d_{90}$ ranging from 80 to 120 microns. According to some embodiments, the diatomaceous earth has a $d_{10}$ ranging from 7 to 20 microns, a $d_{50}$ ranging from 20 to 50 microns, and a $d_{90}$ ranging from 60 to 120 microns. According to some embodiments, the natural glass has a $d_{10}$ ranging from 10 to 20 microns, a $d_{50}$ ranging from 30 to 70 microns, and a $d_{90}$ ranging from 100 to 160 microns.

According to some embodiments, a ratio of the diatomaceous earth to the natural glass ranges from 1:99 to 99:1 by weight. For example, the ratio of the diatomaceous earth to the natural glass ranges from 1:3 to 3:1 by weight.

According to some embodiments, the composite filter aid has a BET surface area ranging from 5 m$^2$/g to 50 m$^2$/g. According to some embodiments, the composite filter aid has a median pore size ranging from 5 to 35 microns, and/or a surface area ranging from 5 to 40 m$^2$/g. According to some embodiments, the porosity of the composite filter aid ranges from 3 to 7 liters per milligram.

According to some embodiments, the composite filter aid has a beer soluble iron (BSI) content of less than 5 ppm, as measured by the American Society of Brewing Chemists (ASBC) method. For example, the composite filter aid has a BSI content of less than 1 ppm, as measured by ASBC.

According to some embodiments, the composite filter aid may have a BSI content of less than 100 ppm, as measured by the European Beverage Convention (EBC) method. For example, the composite filter aid may have a BSI content of less than 80 ppm, less than 50 ppm, or less than 30 ppm as measured by EBC.

According to some embodiments, the composite filter aid has a cristobalite content of less than 20% by weight. For example, the filter aid has a cristobalite content of less than 10% by weight, less than 6% by weight, or less than 1% by weight.

According to some embodiments, the filter aid has a wet density ranging from 10 to 16 lbs/ft$^3$. According to a further aspect, the filter aid has a wet density ranging from 9 to 15 lbs/ft$^3$.

According to some embodiments, a composite filter aid includes diatomaceous earth, perlite, as second mineral, and a precipitated silica binder, wherein the filter aid has a wet density less than 15 lbs/ft$^3$.

According to some embodiments, a method for making a composite filter aid includes blending a first mineral including diatomaceous earth and/or perlite with a second mineral having an aspect ratio of greater than about 2:1, and adding a binder (e.g., alkali silicate) to the blended minerals, and precipitating the binder (e.g., alkali silicate) to make the composite filter aid material. The method may further include dispersing the binder (e.g., alkali silicate) in water. For example, the method may further include dispersing the binder (e.g., alkali silicate) in water before adding the binder to the blended minerals. The method may further include mixing the binder and the blended minerals. According to some embodiments, the method may further include classifying the mixed binder and blended minerals. The method may further include drying the mixed binder and blended minerals. For example, the drying may include heating the mixed binder and blended minerals to a temperature ranging from 100° C. to 200° C. The method may further include, after drying the mixture, classifying the mixture. The method may further include, prior to blending the minerals, calcining at least one of the minerals (e.g., the diatomaceous earth).

According to some embodiments, a method for filtering a beverage includes using a composite filter aid and/or composite material. For example, the composite filter aid or composite material may include a first mineral including diatomaceous earth and/or natural glass, a second mineral having an aspect ratio of greater than about 2:1, and a binder (e.g., a precipitated silica binder), wherein the composite filter aid or composite material has a permeability ranging from 2 to 20 darcys. The composite filter aid and/or composite material may include diatomaceous earth, natural glass, (e.g., perlite), a second mineral (e.g., having an aspect ratio greater than about 2:1), and a binder (e.g., an inorganic or organic binder (e.g., a precipitated silica binder), wherein the composite filter aid or composite material has a wet density less than 15 lbs/ft$^3$.

Natural Diatomaceous Earth

Processes for preparing the diatomaceous earth products include at least one natural diatomaceous earth as a starting material. As used herein, the term "natural diatomaceous earth" means any diatomaceous earth material that has not been subjected to thermal treatment (e.g., calcination) sufficient to induce formation of greater than 1% cristobalite. In some embodiments, the at least one natural diatomaceous earth is obtained from a saltwater source. In some embodiments, the at least one natural diatomaceous earth is obtained from a freshwater source. In further embodiments, the at least one natural diatomaceous earth is any diatomaceous earth material that may be capable of use in composite material such as a composite filter aid, either in its crude form or after subjecting the material to one or more processing steps. In some embodiments, the at least one natural diatomaceous earth is any diatomaceous earth material that has not been subjected to at least one thermal treatment. In still other embodiments, the at least one natural diatomaceous earth is any diatomaceous earth material that has not been subjected to calcination. Average particle size for the diatomaceous earth ranges from 5 to 200 microns, surface area ranges from 1 to 80 m$^2$/g, pore volume ranges from 2 to 10 L/mg with median pore size from 1 to 20 microns.

According to some embodiments, the diatomaceous earth is any diatomaceous earth material that has been subjected to at least one thermal treatment. In still other embodiments, the diatomaceous earth is any diatomaceous earth material that has been subjected to calcination, for example, being either non-flux calcined or flux-calcined.

As stated earlier, natural diatomaceous earth is, in general, a sedimentary biogenic silica deposit including the fossilized skeletons of diatoms, one-celled algae-like plants that accumulate in marine or fresh water environments. Honeycomb silica structures generally give diatomaceous earth useful characteristics such as absorptive capacity and surface area, chemical stability, and low-bulk density. In some embodiments, natural diatomaceous earth includes about 90% SiO$_2$ mixed with other substances. In some embodiments, crude diatomaceous earth includes about 90% SiO$_2$, plus various metal oxides, such as, but not limited to, Al-, Fe-, Ca-, and Mg-oxides.

The at least one natural diatomaceous earth may have any of various appropriate forms now known to the skilled artisan or hereafter discovered. In some embodiments, the at least one natural diatomaceous earth is unprocessed (e.g., it is not subjected to chemical and/or physical modification processes). Without wishing to be bound by theory, the impurities in natural diatomaceous earth, such as clays and organic matters, may, in some instances, provide higher cation exchange capacity. In some embodiments, the at least one natural diatomaceous earth undergoes minimal processing following mining or extraction. In some embodiments, the at least one natural diatomaceous earth is subjected to at least one physical modification process. Some examples of possible physical modification processes include, but are not limited to, milling, drying, and air classifying. In some embodiments, the at least one natural diatomaceous earth is subjected to at least one chemical modification process. An example of a chemical modification processes is silanization, but other chemical modification processes are contemplated. Silanization may be used to render the surfaces of the at least one natural diatomaceous earth either more hydrophobic or hydrophilic using the methods appropriate for silicate minerals. The natural diatomaceous earth may have a typical median particle size ($d_{50}$) ranging from about 10 microns to about 30 microns, may have a pore volume ranging from about 2 mL/g to about 4 mL/g, may have a median pore size ranging from about 1 microns to about 3 microns, may have a surface area ranging from about 10 m$^2$/g to about 40 m$^2$/g, and/or may have a bulk density ranging from about 4 lbs/ft$^3$ to about 8 lbs/ft$^3$.

Natural Glass

The term "natural glass" as used herein refers to natural glasses, commonly referred to as volcanic glasses, that are formed by the rapid cooling of siliceous magma or lava. Several types of natural glasses are known, including, for example, perlite, pumice, pumicite, shirasu, obsidian, and pitchstone. Prior to processing, perlite may be gray to green in color with abundant spherical cracks that cause it to break into small pearl-like masses. Pumice is a lightweight glassy vesicular rock. Obsidian may be dark in color with a vitreous luster and a characteristic conchoidal fracture. Pitchstone has a waxy resinous luster and may be brown, green, or gray. Volcanic glasses such as perlite and pumice occur in massive deposits and find wide commercial use. Volcanic ash, often referred to as "tuff" when in consolidated form, includes small particles or fragments that may be in glassy form. As used herein, the term natural glass encompasses volcanic ash.

Natural glasses may be chemically equivalent to rhyolite. Natural glasses that are chemically equivalent to trachyte, dacite, andesite, latite, and basalt are known but may be less common. The term "obsidian" is generally applied to large numbers of natural glasses that are rich in silica. Obsidian glasses may be classified into subcategories according to their silica content, with rhyolitic obsidians (containing typically about 73% $SiO_2$ by weight) being the most common.

Perlite is a hydrated natural glass that may contain, for example, about 72 to about 75% $SiO_2$, about 12 to about 14% $Al_2O_3$, about 0.5 to about 2% $Fe_2O_3$, about 3 to about 5% $Na_2O$, about 4 to about 5% $K_2O$, about 0.4 to about 1.5% CaO (by weight), and small amounts of other metallic elements. Perlite may be distinguished from other natural glasses by a higher content (such as about 2 to about 5% by weight) of chemically-bonded water, the presence of a vitreous, pearly luster, and characteristic concentric or arcuate onion skin-like (i.e., perlitic) fractures.

Perlite products may be prepared by milling and thermal expansion, and may possess unique physical properties such as high porosity, low bulk density, and chemical inertness. Average particle size for the milled expanded perlite ranges from 5 to 200 microns, pore volume ranges from 2 to 10 L/mg with median pore size from 5 to 20 microns.

Pumice is a natural glass characterized by a mesoporous structure (e.g., having pores or vesicles with a size up to about 1 mm). The porous nature of pumice gives it a very low apparent density, in many cases allowing it to float on the surface of water. Most commercial pumice contains from about 60% to about 70% $SiO_2$ by weight. Pumice may be processed by milling and classification, and pumice products may be used as lightweight aggregates and also as abrasives, adsorbents, and fillers. Unexpanded pumice and thermally-expanded pumice may also be used as filtration components. The perlite has a typical median particle size ($d_{50}$) ranging from about 20 microns to about 70 microns, a pore volume ranging from about from 3 mL/g to about 8 mL/g, a median pore size ranging from about 10 microns to about 30 microns, a surface area ranging from about 1 $m^2/g$ to about 10 $m^2/g$, a bulk density ranging from about 2 lbs/$ft^3$ to about 6 lbs/$ft^3$.

Binder

The diatomaceous earth and natural glass may be subjected to at least one co-agglomeration with at least one binder. For example, in some embodiments, the binder is at least one alkali silica binder. In some embodiments, the binder is at least one of sodium silicate and potassium silicate.

According to some embodiments, the binder may include at least one of an inorganic binder, an organic binder, or an organic-to-inorganic binder. According to some embodiments, the binder may include an inorganic binder, such as an alkali silicate, such as, for example, sodium silicate, potassium silicate, and mixtures thereof. According to some embodiments, the inorganic binder may include a cement, such as a calcium aluminate cement. In some embodiments, the inorganic binder may include a cement, such as a calcium phosphate cement, and/or a magnesium phosphate cement. In some embodiments, the inorganic binder may include a magnesium aluminum silicate clay. According to some embodiments, the binder may include an organic-to-inorganic binder, such as a silicone or ethyl silicate.

According to some embodiments, the binder may include one or more organic binders or biopolymers. For example, the binder may include a cellulose, polyethylene glycol (PEG), polyvinyl alcohol (PVA), polyvinylpyrrolidone (PVP), starch, Candalilla wax, a polyacrylate or related copolymer (e.g., acrylic acid-acrylamide, etc.), a polydiallyldimethylammonium chloride polymer or copolymer (pDADMAC, etc.), dextrin, lignosulfonate, sodium alginate, magnesium stearate, and/or mixtures thereof.

Co-Agglomeration

Co-agglomeration of a first mineral, such as, diatomaceous earth material and/or natural glass, a second mineral, and a binder, or of heat-treated diatomaceous earth and/or heat-treated natural glass, as second mineral, and a binder (e.g., a silica binder), may occur through any appropriate agglomeration processes now known to the skilled artisan or hereafter discovered. For example, in some embodiments, co-agglomeration includes preparing at least one aqueous solution of the binder, and contacting the binder solution with a blend of the first mineral and the second mineral. One or more agglomerations may be performed, for example, when multiple binders, multiple first minerals, and/or multiple second minerals are used.

In some embodiments, contacting includes mixing the binder solution with a blend of the first and second minerals. In some embodiments, the mixing includes agitation. In some embodiments, the blend of the first mineral, the second mineral, and the binder solution is mixed sufficiently to at least substantially uniformly distribute the binder solution among the agglomeration points of contact of the first and second minerals. In some embodiments, the blend of the first and second minerals and the binder solution is mixed with sufficient agitation to at least substantially uniformly distribute the binder solution among the agglomeration points of contact of the blend of first and second minerals without damaging the structure of the diatomaceous earth or natural glass. In some embodiments, the contacting includes low-shear mixing.

In some embodiments, mixing occurs for about one hour. In other embodiments, mixing occurs for less than about one hour. In further embodiments, mixing occurs for about 30 minutes. In yet other embodiments, mixing occurs for about 20 minutes. In still further embodiments, mixing occurs for about 10 minutes.

In some embodiments, mixing occurs at about room temperature (i.e., from about 20° C. to about 23° C.). In other embodiments, mixing occurs at a temperature ranging from about 20° C. to about 50° C. In further embodiments, mixing occurs at a temperature ranging from about 30° C. to about 45° C. In still other embodiments, mixing occurs at a temperature of from about 35° C. to about 40° C.

According to some embodiments, contacting includes spraying the blend of first and second minerals with at least one binder solution. In some embodiments, the spraying is intermittent. In other embodiments, the spraying is continuous. In further embodiments, spraying includes mixing the blend of the first and second minerals while spraying with at least one binder solution, for example, to expose different agglomeration points of contacts to the spray. In some embodiments, such mixing is intermittent. In other embodiments, such mixing is continuous.

In some embodiments, the at least one binder is present in the binder solution in an amount less than about 40% by weight, relative to the weight of the at least one binder solution. In some embodiments, the at least one binder ranges from about 1% to about 10% by weight. In further embodiments, the at least one binder ranges from about 1% to about 5% by weight.

The at least one aqueous solution of the at least one binder may be prepared with water. In some embodiments, the water is deionized water. In some embodiments, the water is ultrapure water. In further embodiments, the water has been treated to remove or decrease the levels of metals, toxins, and/or other undesirable elements before it is contacted with the at least one binder.

The amount of at least one aqueous solution contacted with the blend of the first and second minerals may range from about 0.25 parts to about 1.5 parts of aqueous solution to one part blend. In some embodiments, about 1 part aqueous solution is contacted with about 1 part blend.

Classification

Before and/or after the agglomeration, the first and/or second minerals may be subjected to at least one classification step. For example, before and/or after at least one heat treatment, diatomaceous earth may, in some embodiments, be subjected to at least one classification step. In some embodiments, the particle size of the diatomaceous earth material and/or natural glass may be adjusted to a suitable or desired size using any one of several techniques well known in the art. In some embodiments, the first and/or second minerals may be subjected to at least one mechanical separation to adjust the powder size distribution. Appropriate mechanical separation techniques are well known to the skilled artisan and include, but are not limited to, milling, grinding, screening, extrusion, triboelectric separation, liquid classification, aging, and air classification.

Heat Treatment

The first and/or second minerals and/or co-agglomerated minerals may be subjected to at least one heat treatment. Appropriate heat treatment processes are well-known to the skilled artisan and include those now known or that may hereinafter be discovered. In some embodiments, the at least one heat treatment decreases the amount of organics and/or volatiles in the heat-treated first and/or second minerals. In some embodiments, the at least one heat treatment includes at least one calcination. In some embodiments, the at least one heat treatment includes at least one flux calcination. In some embodiments, the at least one heat treatment includes at least one roasting.

Calcination may be conducted according to any appropriate process now known to the skilled artisan or hereafter discovered. In some embodiments, calcination is conducted at temperatures below the melting point of the first and/or second minerals. In some embodiments, calcination is conducted at a temperature ranging from about 600° C. to about 1100° C. In some embodiments, the calcination temperature ranges from about 600° C. to about 700° C. In some embodiments, the calcination temperature ranges from about 700° C. to about 800° C. In some embodiments, the calcination temperature ranges from about 800° C. to about 900° C. In some embodiments, the calcination temperature is chosen from the group consisting of about 600° C., about 700° C., about 800° C., about 900° C., about 1000° C., and about 1100° C. Heat treatment at a lower temperature may result in an energy savings over other processes for the preparation of the first and/or second minerals.

Flux calcination includes conducting at least one calcination in the presence of at least one fluxing agent. Flux calcination may be conducted according to any appropriate process now known to the skilled artisan or hereafter discovered. In some embodiments, the at least one fluxing agent is any material now known to the skilled artisan or hereafter discovered that may act as a fluxing agent. In some embodiments, the at least one fluxing agent is a salt including at least one alkali metal. In some embodiments, the at least one fluxing agent is chosen from the group consisting of carbonate, silicate, chloride, and hydroxide salts. In other embodiments, the at least one fluxing agent is chosen from the group consisting of sodium, potassium, rubidium, and cesium salts. In still further embodiments, the at least one fluxing agent is chosen from the group consisting of sodium, potassium, rubidium, and cesium carbonate salts.

Roasting may be conducted according to any appropriate process now known to the skilled artisan or hereafter discovered. In some embodiments, roasting is a calcination process conducted at a generally lower temperature that helps to avoid formation of crystalline silica in, for example, the diatomaceous earth and/or natural glass. In some embodiments, roasting is conducted at a temperature ranging from about 450° C. to about 900° C. In some embodiments, the roasting temperature ranges from about 500° C. to about 800° C. In some embodiments, the roasting temperature ranges from about 600° C. to about 700° C. In some embodiments, the roasting temperature ranges from about 700° C. to about 900° C. In some embodiments, the roasting temperature is chosen from the group consisting of about 450° C., about 500° C., about 600° C., about 700° C., about 800° C., and about 900° C.

According to some embodiments, the first and/or second minerals may be subjected to at least one heat treatment, followed by co-agglomerating the heat-treated first and/or second minerals with at least one binder.

Composite Filter Aid or Composite Material

The composite filter aid or composite material made by the processes described herein may have one or more beneficial attributes, making them desirable for use in one or a number of given applications. In some embodiments, the composite filter aids or composite materials may be useful as part of a filter aid composition. In some embodiments, a filter aid composition may include at least one composite material.

The composite filter aids disclosed herein may have a permeability suitable for use in a filter aid composition. Permeability may be measured by any appropriate measurement technique now known to the skilled artisan or hereafter discovered. Permeability is generally measured in darcy units or darcy, as determined by the permeability of a porous bed 1 cm high and with a 1 cm$^2$ section through which flows a fluid with a viscosity of 1 mPa·s with a flow rate of 1 cm$^3$/sec under an applied pressure differential of 1 atmosphere. The principles for measuring permeability have been previously derived for porous media from Darcy's law (see, for example, J. Bear, "The Equation of Motion of a Homogeneous Fluid: Derivations of Darcy's Law," in *Dynamics of Fluids in Porous Media* 161-177 (2nd ed. 1988)). An array of devices and methods are in existence that may correlate with permeability. In one exemplary method useful for measuring permeability, a specially constructed device is designed to form a filter cake on a septum from a suspension of filtration media in water; and the time required for a specified volume of water to flow through a measured thickness of filter cake of known cross-sectional area is measured.

In some embodiments, the composite material has a permeability ranging from about 0.2 darcys to about 20 darcys. In some embodiments, the composite material has a permeability ranging from about 3 darcys to about 16 darcys. In some embodiments, the composite material has a permeability ranging from about 5 darcys to about 16 darcys. In some embodiments, permeability ranges from about 9 darcys to about 16 darcys. In some embodiments, the permeability ranges from about 11 darcys to about 16 darcys.

The composite materials disclosed herein have a particle size. Particle size may be measured by any appropriate measurement technique now known to the skilled artisan or hereafter discovered. In one exemplary method, particle size and particle size properties, such as particle size distribution ("psd"), are measured using a Leeds and Northrup Microtrac X100 laser particle size analyzer (Leeds and Northrup, North Wales, Pa., USA), which can determine particle size distribution over a particle size range from 0.12 micrometers (μm or microns) to 704 μm. The size of a given particle is expressed in terms of the diameter of a sphere of equivalent diameter that sediments through the suspension, also known as an equivalent spherical diameter or "esd." The median particle size, or $d_{50}$ value, is the value at which 50% by weight of the particles have an esd less than that $d_{50}$ value. The $d_{10}$ value is the value at which 10% by weight of the particles have an esd less than that $d_{10}$ value. The $d_{90}$ value is the value at which 90% by weight of the particles have an esd less than that $d_{90}$ value.

In some embodiments, the $d_{10}$ of the composite material ranges from about 10 μm to about 30 μm. In some embodiments, the $d_{10}$ ranges from about 15 μm to about 30 μm. In some embodiments, the $d_{10}$ ranges from about 20 μm to about 30 μm.

In some embodiments, the $d_{50}$ of the composite material ranges from about 30 μm to about 70 μm. In some embodiments, the $d_{50}$ ranges from about 50 μm to about 70 μm. In some embodiments, the $d_{50}$ ranges from about 60 μm to about 70 μm.

In some embodiments, the $d_{90}$ of the composite material ranges from about 80 μm to about 120 μm. In some embodiments, the $d_{90}$ ranges from about 90 μm to about 120 μm. In some embodiments, the $d_{90}$ ranges from about 100 μm to about 120 μm. In some embodiments, the $d_{90}$ ranges from about 110 μm to about 120 μm.

The composite materials disclosed herein may have a low crystalline silica content. Forms of crystalline silica include, but are not limited to, quartz, cristobalite, and tridymite. In some embodiments, the composite material has a lower content of at least one crystalline silica than a composite material not subjected to at least one co-agglomeration with at least one silica binder.

The composite materials disclosed herein may have a low cristobalite content. Cristobalite content may be measured by any appropriate measurement technique now known to the skilled artisan or hereafter discovered. In one exemplary method, cristobalite content is measured by x-ray diffraction. Cristobalite content may be measured, for example, by the quantitative X-ray diffraction method outlined in H. P. Klug and L. E. Alexander, *X-Ray Diffraction Procedures for Polycrystalline and Amorphous Materials* 531-563 (2nd ed. 1972). According to one example of that method, a sample is milled in a mortar and pestle to a fine powder, then back-loaded into a sample holder. The sample and its holder are placed into the beam path of an X-ray diffraction system and exposed to collimated X-rays using an accelerating voltage of 40 kV and a current of 20 mA focused on a copper target. Diffraction data are acquired by step-scanning over the angular region representing the interplanar spacing within the crystalline lattice structure of cristobalite, yielding the greatest diffracted intensity. That region ranges from 21 to 23 2θ (2-theta), with data collected in 0.05 2θ steps, counted for 20 seconds per step. The net integrated peak intensity is compared with those of standards of cristobalite prepared by the standard additions method in amorphous silica to determine the weight percent of the cristobalite phase in a sample.

In some embodiments, the cristobalite content is less than about 20% by weight. In some embodiments, the cristobalite content is less than about 10% by weight. In some embodiments, the cristobalite content is less than about 6% by weight. In some embodiments, the cristobalite content is less than about 1% by weight. In some embodiments, the composite material has a lower cristobalite content than materials not subjected to co-agglomeration with, for example, a natural glass and/or a second mineral, and at least one binder (e.g., at least one silica binder).

Composite materials disclosed herein may have a low quartz content. Quartz content may be measured by any appropriate measurement technique now known to the skilled artisan or hereafter discovered. In one exemplary method, quartz content is measured by x-ray diffraction. For example, quartz content may be measured by the same x-ray diffraction method described above for cristobalite content, except the that 2θ region ranges from 26.0 to 27.5 degrees. In some embodiments, the quartz content is less than about 0.5% by weight. In some embodiments, the quartz content is less than about 0.25% by weight. In some embodiments, the quartz content is less than about 0.1% by weight. In some embodiments, the quartz content is about 0% by weight. In some embodiments, the quartz content ranges from about 0% to about 0.5% by weight. In some embodiments, the quartz content ranges from about 0% to about 0.25% by weight.

Composite materials disclosed herein may have a measurable pore volume. Pore volume may be measured by any appropriate measurement technique now known to the skilled artisan or hereafter discovered. In one exemplary method, pore volume is measured with an AutoPore IV 9500 series mercury porosimeter from Micromeritics Instrument Corporation (Norcross, Ga., USA), which can determine measure pore diameters ranging from 0.006 to 600 μm. As used to measure the pore volume of the composite materials disclosed herein, that porosimeter's contact angle was set at 130 degrees, and the pressure ranged from 0 to 33,000 psi. In some embodiments, the pore volume is about equal to at least one natural diatomaceous earth, natural glass, and/or second mineral, from which it is made. In some embodiments, the pore volume ranges from about 3 mL/g to about 10 mL/g. In some embodiments, the pore volume ranges from about 4 mL/g to about 8 mL/g. In some embodiments, the pore volume ranges from about 5 mL/g to about 7 mL/g. In some embodiments, the pore volume is about 6 mL/g.

Composite materials disclosed herein may have a measurable median pore diameter. Median pore diameter may be measured by any appropriate measurement technique now known to the skilled artisan or hereafter discovered. In one exemplary method, median pore diameter is measured with an AutoPore IV 9500 series mercury porosimeter, as described above. In some embodiments, the median pore diameter ranges from about 10 μm to about 40 μm. In some embodiments, the median pore diameter ranges from about 15 μm to about 30 μm. In some embodiments, the median pore diameter ranges from about 20 μm to about 30 μm.

Composite materials disclosed herein may have a measurable wet density, which as used herein refers to measurement of centrifuged wet density. According to one exemplary method, to measure wet density, a composite material sample of known weight from about 1.00 to about 2.00 g is placed in a calibrated 15 ml centrifuge tube to which deionized water is added to make up a volume of approximately 10 ml. The mixture is shaken thoroughly until all of the sample is wetted, and no powder remains. Additional deionized water is added around the top of the centrifuge tube to rinse down any mixture adhering to the side of the tube from shaking. The tube is centrifuged for 5 minutes at 2500 rpm on an IEC Centra® MP-4R centrifuge, equipped with a Model 221 swinging bucket rotor (International Equipment Company; Needham Heights, Mass., USA). Following centrifugation, the tube is carefully removed without disturbing the solids, and the level (i.e., volume) of the settled matter is measured in $cm^3$. The centrifuged wet density of powder is readily calculated by dividing the sample weight by the measured volume. In some embodiments, the wet density ranges from about 10 $lbs/ft^3$ to about 20 $lbs/ft^3$. In some embodiments, the wet density ranges from about 10 $lbs/ft^3$ to about 16 $lbs/ft^3$.

Composite materials disclosed herein may include at least one soluble metal. As used herein, the term "soluble metal" refers to any metal that may be dissolved in at least one liquid. Soluble metals are known to those of skill in the art and include, but are not limited to, iron, aluminum, calcium, vanadium, chromium, copper, zinc, nickel, cadmium, and mercury. When a filter aid including a composite material is used to filter at least one liquid, at least one soluble metal may dissociate from the composite material filter aid and enter the liquid. In many applications, such an increase in metal content of the liquid may be undesirable and/or unacceptable. For example, when a filter aid including a composite material is used to filter beer, a high level of iron dissolved in the beer from the filter aid may adversely affect sensory or other properties, including but not limited to taste and shelf-life.

Any appropriate protocol or test for measuring levels of at least one soluble metal in composite materials may be used, including those now known to the skilled artisan or hereafter discovered. For example, the brewing industry has developed at least one protocol to measure the beer soluble iron (BSI) of composite material filter aids. BSI refers to the iron content, which may be measured in parts per million, of a filter aid including an material that dissociates in the presence of a liquid, such as beer, as measured, for example, by ASBC or the EBC methods.

In some embodiments, the beer soluble iron of the composite material disclosed herein ranges from less about 1 ppm to about 5 ppm, when measured using an ASBC method. In some embodiments, the beer soluble iron ranges from about 1 ppm to about 4 ppm. In some embodiments, the beer soluble iron ranges from about 1 ppm to about 2 ppm. In some embodiments, the beer soluble iron is less than about 1 ppm.

According to some embodiments, the beer soluble iron of the composite material disclosed herein is less than 100 ppm, as measured by the EBC method. For example, the beer soluble iron content is less than 80 ppm, less than 50 ppm, or less than 30 ppm, as measured by the EBC method.

The composite materials disclosed herein may have a measurable BET surface area. BET surface area, as used herein, refers to the technique for calculating specific surface area of physical absorption molecules according to Brunauer, Emmett, and Teller ("BET") theory. BET surface area may be measured by any appropriate measurement technique now known to the skilled artisan or hereafter discovered. In one exemplary method, BET surface area is measured with a Gemini III 2375 Surface Area Analyzer, using pure nitrogen as the sorbent gas, from Micromeritics Instrument Corporation (Norcross, Ga., USA). In some embodiments, the BET surface area is greater than for a material not produced according to embodiments described herein (e.g., without co-agglomerating diatomaceous earth and natural glass with at least one silica binder). In some embodiments, the BET surface area ranges from about 1 $m^2/g$ to about 50 $m^2/g$. In some embodiments, the BET surface area ranges from about 5 $m^2/g$ to about 30 $m^2/g$. In some embodiments, the BET surface area is greater than about 10 $m^2/g$.

Exemplary Uses for Composite Materials

The exemplary composite materials disclosed herein may be used in any of a variety of processes, applications, and materials. For example, the composite materials may be used in at least one process, application, or material in which such a product with a high BET surface area is desirable.

For example, the composite materials may be incorporated into a filter aid material or composition. A filter aid composition including at least one composite material may optionally include at least one additional filter aid medium. Examples of suitable additional filter aid media include, but are not limited to, natural or synthetic silicate or aluminosilicate materials, unimproved diatomaceous earth, saltwater diatomaceous earth, expanded perlite, pumicite, natural glass, cellulose, activated charcoal, feldspars, nepheline syenite, sepiolite, zeolite, mica, talk, clay, kaolin, smectite, wollastonite, and combinations thereof.

The at least one additional filter medium may be present in any appropriate amount. For example, the at least one additional filter medium may be present from about 0.01 to about 100 parts of at least one additional filter medium per part of the composite material. In some embodiments, the at least one additional filter medium is present from about 0.1 to about 10 parts. In some embodiments, the at least one additional filter medium is present from about 0.5 to 5 parts.

The filter aid composition may be formed into sheets, pads, cartridges, or other monolithic or aggregate media capable of being used as supports or substrates in a filter process. Considerations in the manufacture of filter aid compositions may include a variety of parameters, including but not limited to total soluble metal content of the composition, median soluble metal content of the composition, particle size distribution, pore size, cost, and availability.

A filter aid composition including at least one composite material may be used in a variety of processes and compositions. In some embodiments, the filter aid composition is applied to a filter septum to protect it and/or to improve clarity of the liquid to be filtered in a filtration process. In some embodiments, the filter aid composition is added directly to a beverage to be filtered to increase flow rate and/or extend the filtration cycle. In some embodiments, the filter aid composition is used as pre-coating, in body feeding, or a combination of both pre-coating and body feeding, in a filtration process.

Embodiments of the composite material may also be used in a variety of filtering methods. In some embodiments, the filtering method includes pre-coating at least one filter element with at least one composite material, and contacting at least one liquid to be filtered with the at least one coated filter element. In such embodiments, the contacting may include passing the liquid through the filter element. In some embodiments, the filtering method includes suspending at least one composite material filter aid in at least one liquid containing particles to be removed from the liquid, and thereafter separating the filter aid from the filtered liquid.

Filter aids including at least one composite material disclosed herein may also be employed to filter various types of liquids. The skilled artisan is readily aware of liquids that may be desirably filtered with a process including the filter aids including at least composite material disclosed herein. In some embodiments, the liquid is a beverage. Exemplary beverages include, but are not limited to, vegetable-based juices, fruit juices, distilled spirits, and malt-based liquids. Exemplary malt-based liquids include, but are not limited to, beer and wine. In some embodiments, the liquid is one that tends to form haze upon chilling. In some embodiments, the liquid is a beverage that tends to form haze upon chilling. In some embodiments, the liquid is a beer. In some embodiments, the liquid is an oil. In some embodiments, the liquid is an edible oil. In some embodiments, the liquid is a fuel oil. In some embodiments, the liquid is water, including but not limited to waste water. In some embodiments, the liquid is blood. In some embodiments, the liquid is a sake. In some embodiments, the liquid is a sweetener, such as, for example, corn syrup or molasses.

The composite materials disclosed herein may also be used in applications other than filtration. In some embodiments, the composite materials may be used as composites in filler applications, such as, for example, fillers in construction or building materials. In some embodiments, the composite materials may be used to alter the appearance and/or properties of paints, enamels, lacquers, or related coatings and finishes. In some embodiments, the composite materials may be used in paper formulations and/or paper processing applications. In some embodiments, the composite materials may be used to provide anti-block and/or reinforcing properties to polymers. In some embodiments, the composite materials may be used as or in abrasives. In some embodiments, the composite materials may be used for buffing or in buffing compositions. In some embodiments, the composite materials may be used for polishing or in polishing compositions. In some embodiments, the composite materials may be used in the processing and/or preparation of catalysts. In some embodiments, the composite materials may be used as chromatographic supports or other support media. In some embodiments, the composite materials may be blended, mixed, or otherwise combined with other ingredients to make monolithic or aggregate media useful in a variety of applications, including but not limited to supports (e.g., for microbe immobilization) and substrates (e.g., for enzyme immobilization).

EXAMPLES

Several examples consistent with the composite filter aids and composite materials disclosed herein, along with several comparative examples, are described below. The examples were used as filter aids which were tested, and properties of the examples are provided in Table 1 below.

For the examples, a natural diatomaceous earth ore from Almeria, Mexico (Massive ore) was used as the diatomaceous earth feed material. This diatomaceous earth feed material had the following particle size distribution: a $d_{10}$ of 8 microns, a $d_{50}$ of 22 microns, and $d_{90}$ of 66 microns. A commercially available, expanded and milled Harborlite 400 perlite product was used as the natural glass feed material. This natural glass feed material had the following particle size distribution: a $d_{10}$ of 8 microns, a $d_{50}$ of 25 microns, and a $d_{90}$ of 60 microns. A commercially available mica, IMERYS 4K™, muscovite mica, was used as the mica feed material. This mica feed material had a median particle size of 47 microns and an aspect ratio of 50.

A biopolymer binder such as sodium alginate was prepared as follows: 0.4 grams of Manugel DMP from FMC was dispersed in 80 grams of water and thereafter slowly added to 200 grams of a mixture of the diatomaceous earth feed material and the mica feed material in a Hobart food mixer. The same amount of sodium alginate solution was used for all the mixtures of diatomaceous earth feed material and the mica feed material with different ratios.

A silica binder was prepared as follows: 20 grams of sodium silicate was dispersed in 80 grams of water and thereafter slowly added to 200 grams of a mixture of the natural diatomaceous earth feed material and the mica feed material in a Hobart food mixer. The same amount of sodium silicate solution was used for all the mixtures of the natural diatomaceous earth feed material and the mica feed material with different ratios.

A calcium aluminate cement binder was prepared as follows: 2 grams of calcium aluminate cement was dispersed in 80 grams of water and thereafter slowly added to 200 grams of a mixture of the natural diatomaceous earth feed material and the mica feed material in a Hobart food mixer. The same amount of calcium aluminate cement solution was used for all the mixtures of the natural diatomaceous earth feed material and the mica feed material with different ratios.

After mixing in for 15 minutes, the mixture of sodium silicate solution, diatomaceous earth feed material, and mica feed material was brushed through a 16 mesh screen with 1.18 millimeter openings. The oversize particles were broken and forced through the screen by brushing. After drying in a 150° C. oven overnight and calcining at 800° C. for 30 minutes, the material was brushed through a 30 mesh screen with 0.6 millimeter openings.

A silica binder was prepared as follows: 20 grams of sodium silicate was dispersed in 40 grams of water and thereafter slowly added to 200 grams of a mixture of the natural glass feed material and the mica feed material in a Hobart food mixer. The same amount of sodium silicate solution was used for all the mixtures of the natural glass feed material and the mica feed material with different ratios. After mixing in for 15 minutes, the mixture of sodium silicate solution, diatomaceous earth feed material, and natural glass feed material was brushed through a 16 mesh screen with 1.18 millimeter openings. The oversize particles were broken and forced through the screen by brushing. After drying in a 150° C. oven overnight, the material was brushed through a 30 mesh screen with 0.6 millimeter openings.

Examples 1-12

Examples 1-12 were co-agglomerated diatomaceous earth and mica composites with sodium alginate, sodium silicate, and aluminate cement as the binders. Compared to agglomerated diatomaceous earth (Example 1), the co-agglomerated diatomaceous earth and mica composites have higher permeability. While not wishing to be bound by theory, it is believed that adding mica increases permeability, probably due to the increased spacing of the agglomerated composite particles by the platy structure of mica. Porosimetry measurement confirmed that the co-agglomerated diatomaceous earth and mica composites had large pore diameters compared to the agglomerated diatomaceous earth.

TABLE 1

| Examples | DE (%) | Mica (%) | Manugel (%) | Sodium silicate (%) | Ca—Al cement (%) | Water (%) | Permeability (Darcy) |
|---|---|---|---|---|---|---|---|
| 1 | 100 | | 0.2 | | | 40 | 0.39 |
| 2 | 90 | 10 | 0.2 | | | 40 | 0.44 |
| 3 | 75 | 25 | 0.2 | | | 40 | 0.69 |
| 4 | 50 | 50 | 0.2 | | | 40 | 1.81 |
| 5 | 100 | | | 10 | | 40 | 0.49 |
| 6 | 90 | 10 | | 10 | | 40 | 0.60 |
| 7 | 75 | 25 | | 10 | | 40 | 0.93 |
| 8 | 50 | 50 | | 10 | | 40 | 2.94 |
| 9 | 100 | | | | 1 | 40 | 0.49 |
| 10 | 90 | 10 | | | 1 | 40 | 0.62 |
| 11 | 75 | 25 | | | 1 | 40 | 0.63 |
| 12 | 50 | 50 | | | 1 | 40 | 1.80 |

| Examples | Pore Volume (mL/g) | Median Pore Diameter (μm) | Wet Density (lb/cf) |
|---|---|---|---|
| 1 | 3.6917 | 1.6960 | 12.7 |
| 2 | 4.0780 | 1.7120 | 13.6 |
| 3 | 3.3744 | 2.2435 | 15.2 |
| 4 | 2.9047 | 3.9021 | 17.3 |
| 5 | 3.9735 | 1.9516 | 13.6 |
| 6 | 3.9881 | 1.9608 | 13.9 |
| 7 | 3.3729 | 2.4988 | 15.4 |
| 8 | 2.8722 | 4.7572 | 17.8 |
| 9 | 4.0166 | 1.7697 | 12.6 |
| 10 | 4.0731 | 1.8338 | 13.0 |
| 11 | 3.4857 | 2.2091 | 15.2 |
| 12 | 2.7710 | 3.5971 | 15.8 |

Figure 4:
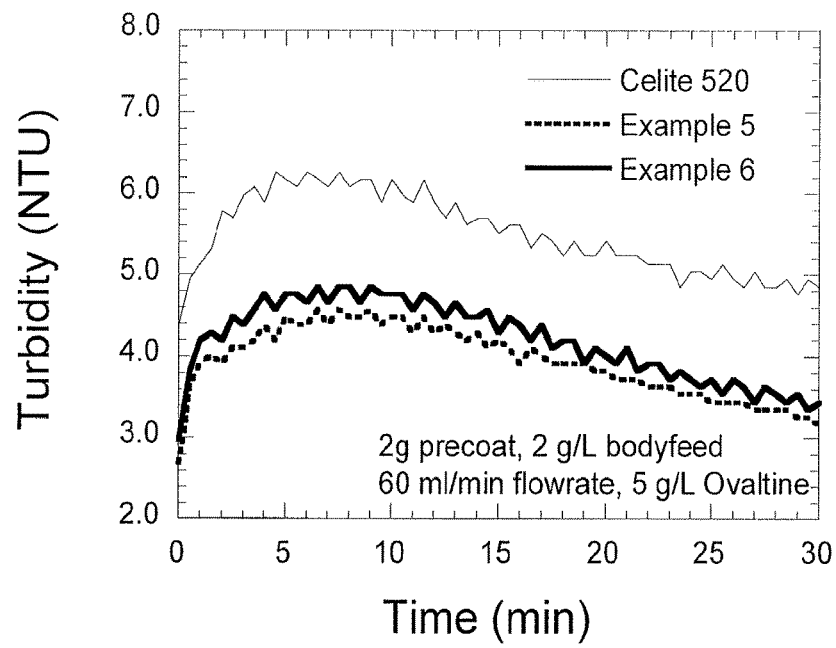
FIG. 4 is a graph showing turbidity versus filtration time for three exemplary composite filter aids.
Figure 5:
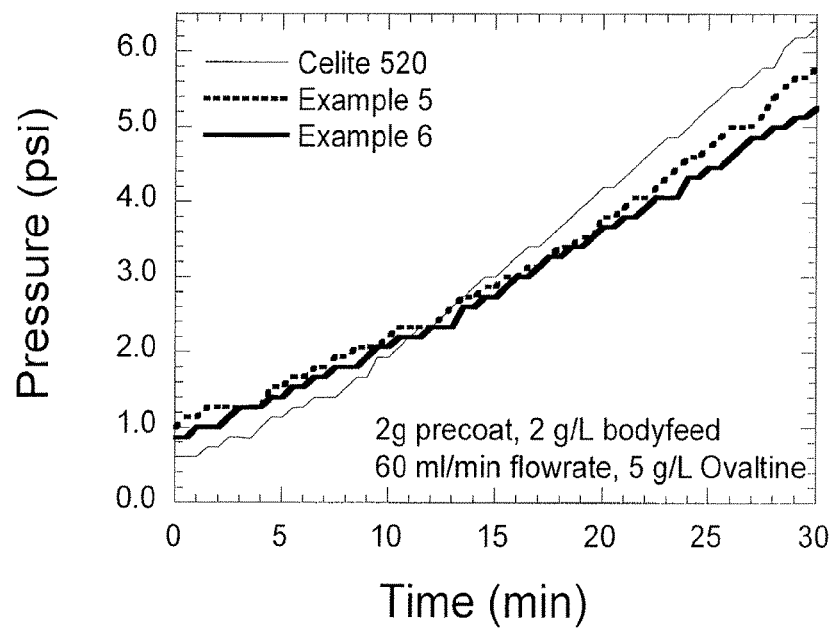
FIG. 5 is a graph showing pressure versus filtration time for the three exemplary composite filter aids shown in FIG. 4.

FIGS. 4 and 5 are graphs depicting turbidity versus filtration time and pressure versus filtration time, respectively, for two exemplary filter aids. As shown in FIG. 4, filter aid of commercially available diatomaceous earth (DE) product Celite 520 had the highest turbidity. Turbidity for both agglomerated DE and co-agglomerated DE and mica composite was significantly lower (about 29% lower). As shown in FIG. 5, both agglomerated DE and co-agglomerated DE and mica composite had lower end pressure compared to the commercially available DE) product Celite 520. The co-agglomerated DE and mica composite had the lowest end pressure due to the bigger pore structure.

Examples 13-16

Examples 13-16 shown in Table 2 below were co-agglomerated natural glass and mica composites with sodium silicate as the binder. Compared to agglomerated natural glass (Example 13), the co-agglomerated natural glass and mica composites have higher permeability, probably due to the bigger pore structure of the agglomerated composite particles

TABLE 2

| Examples | H400 (%) | Mica 4K (%) | Sodium Silicate (%) | Water (%) | Permeability (Darcy) | Wet Density (lb/cf) |
|---|---|---|---|---|---|---|
| 13 | 100 | | 10 | 20 | 0.7 | 13.4 |
| 14 | 75 | 25 | 10 | 20 | 1.2 | 14.5 |
| 15 | 50 | 50 | 10 | 20 | 3.0 | 17.3 |
| 16 | 25 | 75 | 10 | 20 | 5.8 | 21.7 |

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A composite filter aid comprising agglomerated particles, wherein the agglomerated particles comprise a first mineral selected from diatomaceous earth and natural glass, a second mineral having an aspect ratio greater than about 2:1, and a binder co-agglomerated together;
   the filter aid has a permeability ranging from 0.2 to 6.0 darcys; and
   the agglomerated particles have a median particle size (d50) ranging from 30 to 70 microns.

2. The composite filter aid of claim 1, wherein the filter aid has a permeability ranging from 0.3 to 3 darcys.

3. The composite filter aid of claim 1, wherein the ratio of the first mineral to the second mineral ranges from 1:3 to 3:1 by weight.

4. The composite filter aid of claim 1, wherein the filter aid has a wet density ranging from about 12 lb/ft$^3$ to about 19 lb/ft$^3$.

5. The composite filter aid of claim 1, wherein the filter aid has a pore volume ranging from about 2 ml/g to about 4 ml/g.

6. The composite filter aid of claim 1, wherein the filter aid has a median pore diameter ranging from 2 microns to about 6 microns.

7. The composite filter aid of claim 1, wherein the filter aid has a BET surface area ranging from 5 m$^2$/g to about 50 m$^2$/g.

8. The composite filter aid of claim 1, wherein the filter aid has a beer soluble iron content of less than 5 ppm, as measured by ASBC.

9. The composite filter aid of claim 1, wherein the filter aid has a cristobalite content of less than 1% by weight.

10. The composite filter aid of claim 1, wherein the first mineral comprises diatomaceous earth.

11. The composite filter aid of claim 1, wherein the first mineral comprises natural glass, and wherein the natural glass comprises at least one of perlite, volcanic ash, pumice, shirasu, obsidian, pitchstone, and rice hull ash.

12. The composite filter aid of claim 1, wherein the second mineral comprises mica.

13. The composite filter aid of claim 1, wherein the second mineral comprises talc.

14. The composite filter aid of claim 1, wherein the second mineral comprises kaolin.

15. The composite filter aid of claim 1, wherein the second mineral comprises a smectite.

16. The composite filter aid of claim 1, wherein the second mineral comprises wollastonite.

17. The composite filter aid of claim 1, wherein the binder comprises an inorganic binder.

18. A method for making a composite filter aid according to claim 1, the method comprising:
   blending the first mineral, the second mineral, and the binder; and
   co-agglomerating the first and second mineral in the presence of the binder to form particles of composite material.

* * * * *